(12) United States Patent
Smith

(10) Patent No.: US 11,785,951 B1
(45) Date of Patent: Oct. 17, 2023

(54) PIZZA PAN WITH NESTED TIERS AND RELATED METHODS

(71) Applicant: Raymond Smith, Wirral (GB)

(72) Inventor: Raymond Smith, Wirral (GB)

( * ) Notice: Subject to any disclaimer, the term of this patent is extended or adjusted under 35 U.S.C. 154(b) by 0 days.

(21) Appl. No.: 18/150,446

(22) Filed: Jan. 5, 2023

Related U.S. Application Data

(63) Continuation-in-part of application No. 29/864,539, filed on Jun. 3, 2022, now Pat. No. Des. 978,601.

(51) Int. Cl.
*A21B 3/13* (2006.01)

(52) U.S. Cl.
CPC .................................. *A21B 3/138* (2013.01)

(58) Field of Classification Search
CPC ........... A21B 3/138; A21B 3/13; A21B 3/132; A21B 3/137
USPC ........................................................... 99/324
See application file for complete search history.

(56) References Cited

U.S. PATENT DOCUMENTS

| | | |
|---|---|---|
| 846,948 A | 3/1907 | Richter |
| D120,409 S | 2/1938 | Myers |
| D310,324 S | 9/1990 | Bernacchi et al. |
| D379,922 S | 6/1997 | Adams |
| D395,195 S | 6/1998 | Heiberg et al. |
| D489,972 S | 5/2004 | Lin |
| D516,867 S | 3/2006 | Martin et al. |
| D586,612 S | 2/2009 | Rae |
| D594,270 S | 6/2009 | Rae |
| D599,612 S | 9/2009 | Hoekstra |
| D624,354 S * | 9/2010 | Odeh .............................. D7/354 |
| D832,023 S | 10/2018 | Barberi et al. |
| 2003/0006151 A1 | 1/2003 | Lin |
| 2012/0175492 A1* | 7/2012 | Guiliani ................... A47J 43/20 249/140 |

OTHER PUBLICATIONS

UK Design, Unkown Origin, 2016; pp. 1.

\* cited by examiner

*Primary Examiner* — Dana Ross
*Assistant Examiner* — James F Sims, III
(74) *Attorney, Agent, or Firm* — Allen, Dyer, Doppelt + Gilchrist, PA

(57) ABSTRACT

A pan is for receiving and baking a food product in a baking oven. The pan includes nested tiered bands, and canted strips coupled between the nested tiered bands. Each canted strip is canted with respect to adjacent nested tiered bands. The pan also includes a medial body within an innermost nested tiered band of the nested tiered bands, and a peripheral flange extending from an outermost nested tiered band of the nested tiered bands.

20 Claims, 6 Drawing Sheets

PIZZA PAN WITH NESTED TIERS AND RELATED METHODS

RELATED APPLICATION

This application is based upon prior filed copending application No. 29/864,539 filed Jun. 3, 2022, the entire subject matter of which is incorporated herein by reference in its entirety.

TECHNICAL FIELD

The present disclosure relates to the field of cookware, and, more particularly, to a baking pan and related methods.

BACKGROUND

The art of producing pizzas is very old. Indeed, pizza has an origin dating back at least to the 1700s in the Neapolitan region of Italy. Regardless of its Italian origin, the pizza has massive worldwide appeal. Because of the sizable market for pizza products, there is motivation for the continued improvement of such products and modifications of the processes to produce them while keeping costs down.

In restaurants, pizza can be baked in an oven with fire bricks above the heat source, an electric deck oven, a conveyor belt oven, or, in traditional style in a wood or coal-fired brick oven. In some approaches, the pizza is slid into the oven on a long paddle, called a peel, and baked directly on hot bricks, a screen (a round metal grate, typically aluminum), or whatever the oven surface is. In some applications, the pizza is baked on a flat metallic pan (i.e. a pizza pan).

SUMMARY

Generally, a pan is for receiving and baking a food product in a baking oven. The pan comprises a plurality of nested tiered bands, and a plurality of canted strips coupled between the plurality of nested tiered bands. Each canted strip is canted with respect to adjacent nested tiered bands. The pan also includes a medial body within an innermost nested tiered band of the plurality of nested tiered bands, and a peripheral flange extending from an outermost nested tiered band of the plurality of nested tiered bands.

In particular, each of the plurality of nested tiered bands may be vertically offset from one another. The outermost nested tiered band of the plurality of nested tiered bands may be below the innermost nested tiered band of the plurality of nested tiered bands. The plurality of nested tiered bands may be tiered to have decreasing vertical height with respect to the medial body and moving outward.

In some embodiments, the peripheral flange may be canted with respect to the outermost nested tiered band of the plurality of nested tiered bands. The medial body may comprise a cone-shaped body. Also, each of the plurality of canted strips may be substantially parallel with each other. At least one of the plurality of nested tiered bands may be canted. Each of the plurality of nested tiered bands and the plurality of canted strips may be circle-shaped.

Another aspect is directed to a pizza pan for receiving and baking a pizza product in a baking oven. The pizza pan includes a plurality of nested tiered bands, each of the plurality of nested tiered bands being vertically offset from one another. The pizza pan also comprise a plurality of canted strips coupled between the plurality of nested tiered bands, each canted strip being canted with respect to adjacent nested tiered bands. The pizza pan further comprises a medial body within an innermost nested tiered band of the plurality of nested tiered bands, and a peripheral flange extending from an outermost nested tiered band of the plurality of nested tiered bands. The peripheral flange is canted with respect to the outermost nested tiered band of the plurality of nested tiered bands.

Yet another aspect is directed to a method for making a pan for receiving and baking a food product in a baking oven. The method also includes forming a plurality of canted strips coupled between a plurality of nested tiered bands, each canted strip being canted with respect to adjacent nested tiered bands. The method further comprises forming a medial body within an innermost nested tiered band of the plurality of nested tiered bands, and forming a peripheral flange extending from an outermost nested tiered band of the plurality of nested tiered bands.

DETAILED DESCRIPTION

Figure 1:
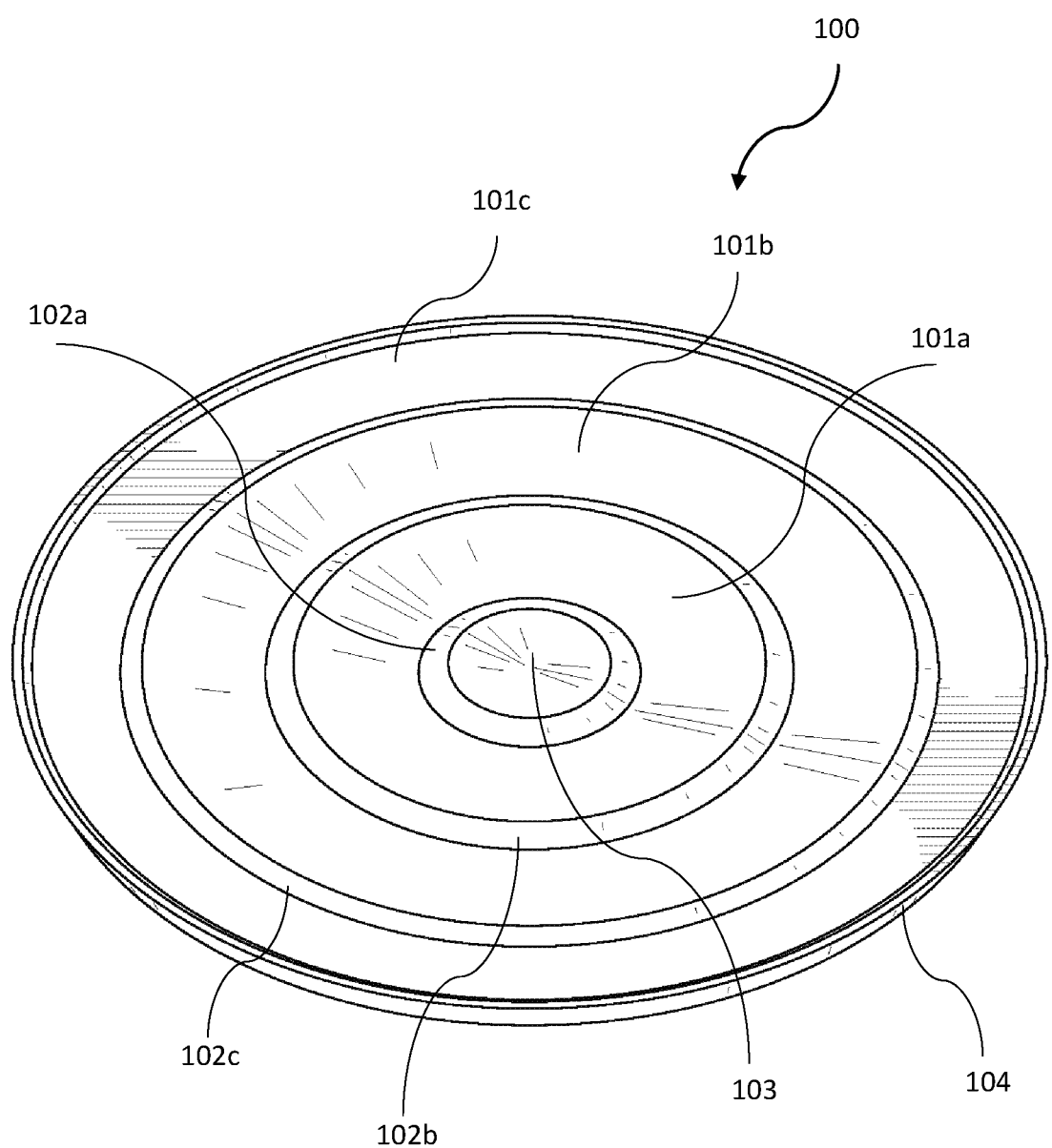
FIG. 1 is a schematic diagram of a perspective view of a pan, according to the present disclosure.
Figure 2:
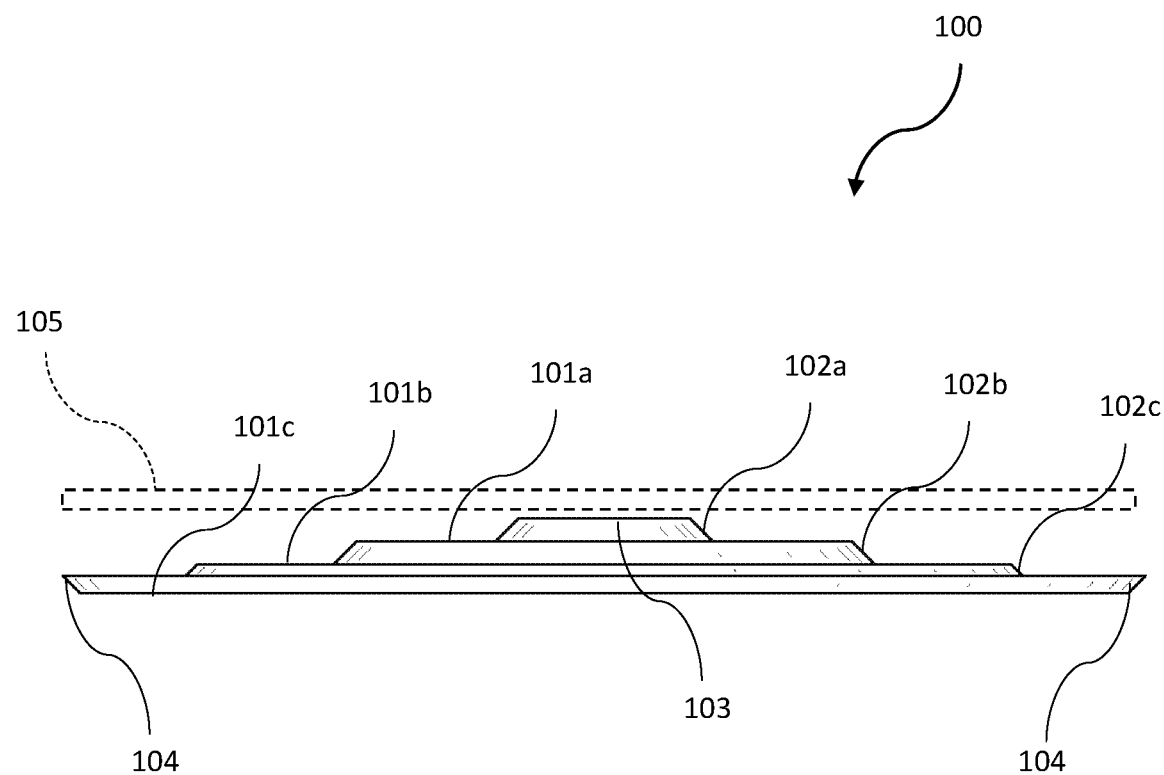
FIG. 2 is a side view of the pan of FIG. 1.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Referring to FIGS. 1-6, a pan 100 is for receiving and baking a food product 105 (e.g. a pizza food product, a bread loaf) in a baking oven. The pan 100 illustratively includes a plurality of nested tiered bands 101a-101c, and a plurality of canted strips 102a-102c (or raisers) coupled between the plurality of nested tiered bands. Each canted strip 102a-102c is canted with respect to adjacent nested tiered bands 101a-101c at a first angle α. The first angle α is illustratively 131°, but may be within a range of 100°-160° in other embodiments.

The pan 100 also includes a medial body 103 within an innermost nested tiered band 101a of the plurality of nested tiered bands 101a-101c. As perhaps best seen in FIG. 5, the medial body 103 illustratively comprises a cone-shaped body. In particular, the medial body 103 has a low point at its center with a slight cant upward moving outward to the innermost nested tiered band 101a. In other embodiments, the medial body 103 may be flat.

The pan 100 also includes a peripheral flange 104 extending from an outermost nested tiered band 101c of the plurality of nested tiered bands 101a-101c. In other words, each of the plurality of nested tiered bands 101a-101c is concentric with each other, being centered about the medial body 103.

Each of the plurality of nested tiered bands 101a-101c is illustratively vertically offset from one another. The outermost nested tiered band 101c of the plurality of nested tiered bands 101a-101c is below the innermost nested tiered band 101a of the plurality of nested tiered bands. As perhaps best seen in FIG. 5, the plurality of nested tiered bands 101a-101c is tiered to have decreasing vertical height with respect to the medial body 103 moving outward (i.e. tiered steps moving downward and outward from the center).

In the illustrated embodiment, the peripheral flange 104 is canted with respect to the outermost nested tiered band 101c of the plurality of nested tiered bands 101a-101c at a second angle θ. The second angle θ is illustratively 41°, but may be within a range of 10°-90° in other embodiments.

Figure 6:
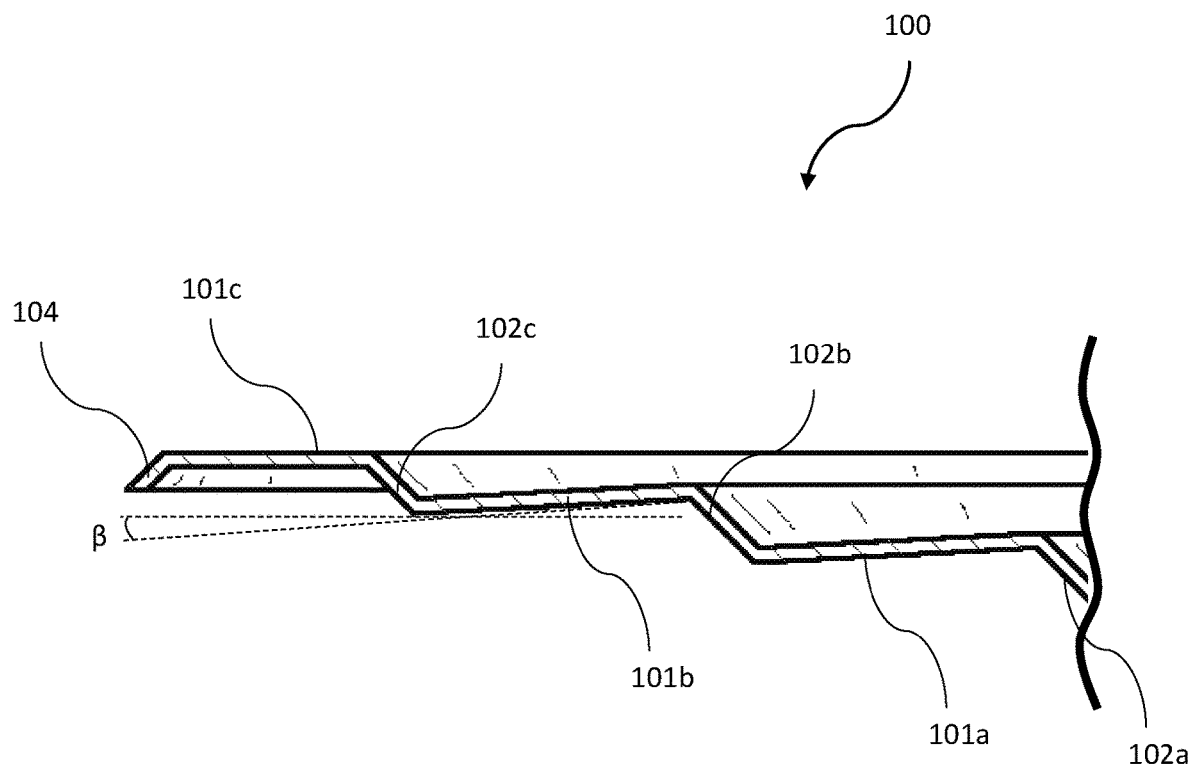
FIG. 6 is an enlarged cross-sectional view of the pan of FIG. 3 along line 5-5.

Also, each of the plurality of canted strips 102a-102c are substantially parallel with each other (i.e. ±10° of parallel). As seen in FIG. 6, the first and second nested tiered bands 101a-101b are canted at a third angle β with respect to a horizontal axis. The third angle β is illustratively 4°, but may be within a range of 2°-10° in other embodiments. In other embodiments, the plurality of nested tiered bands 101a-101c may be flat and parallel with the horizontal axis.

Figure 3:
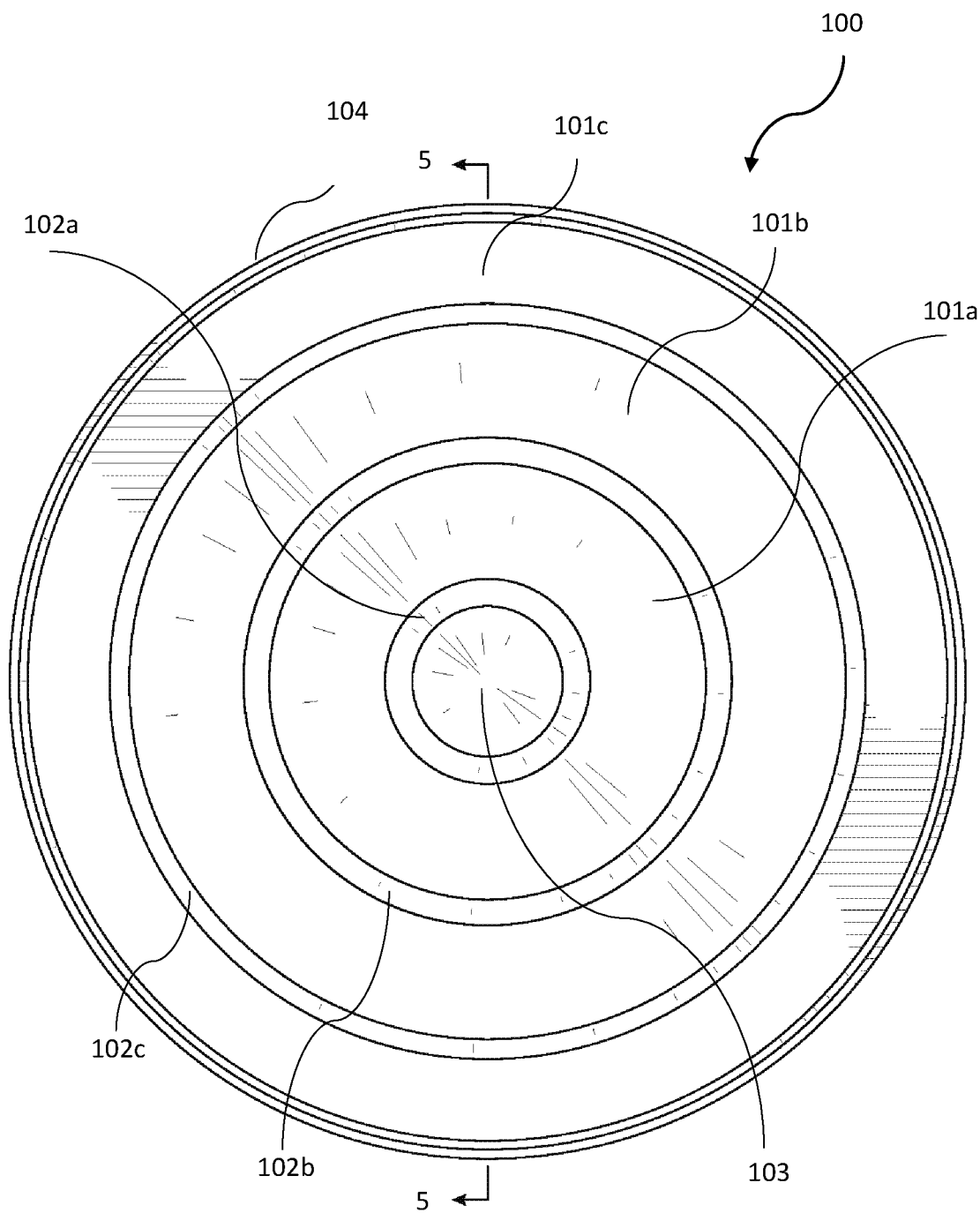
FIG. 3 is a top plan view of the pan of FIG. 1.
Figure 4:
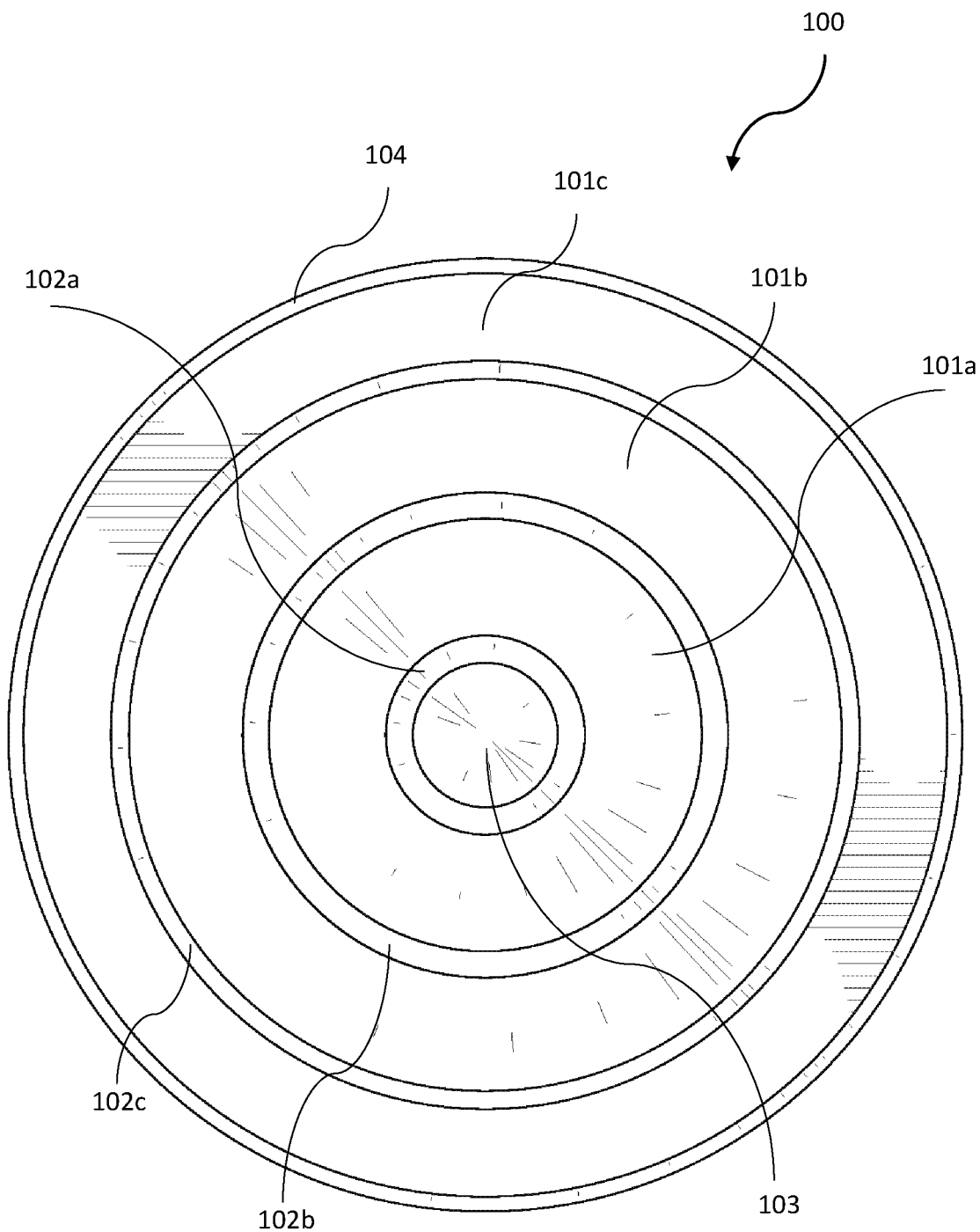
FIG. 4 is a bottom plan view of the pan of FIG. 1.
Figure 5:
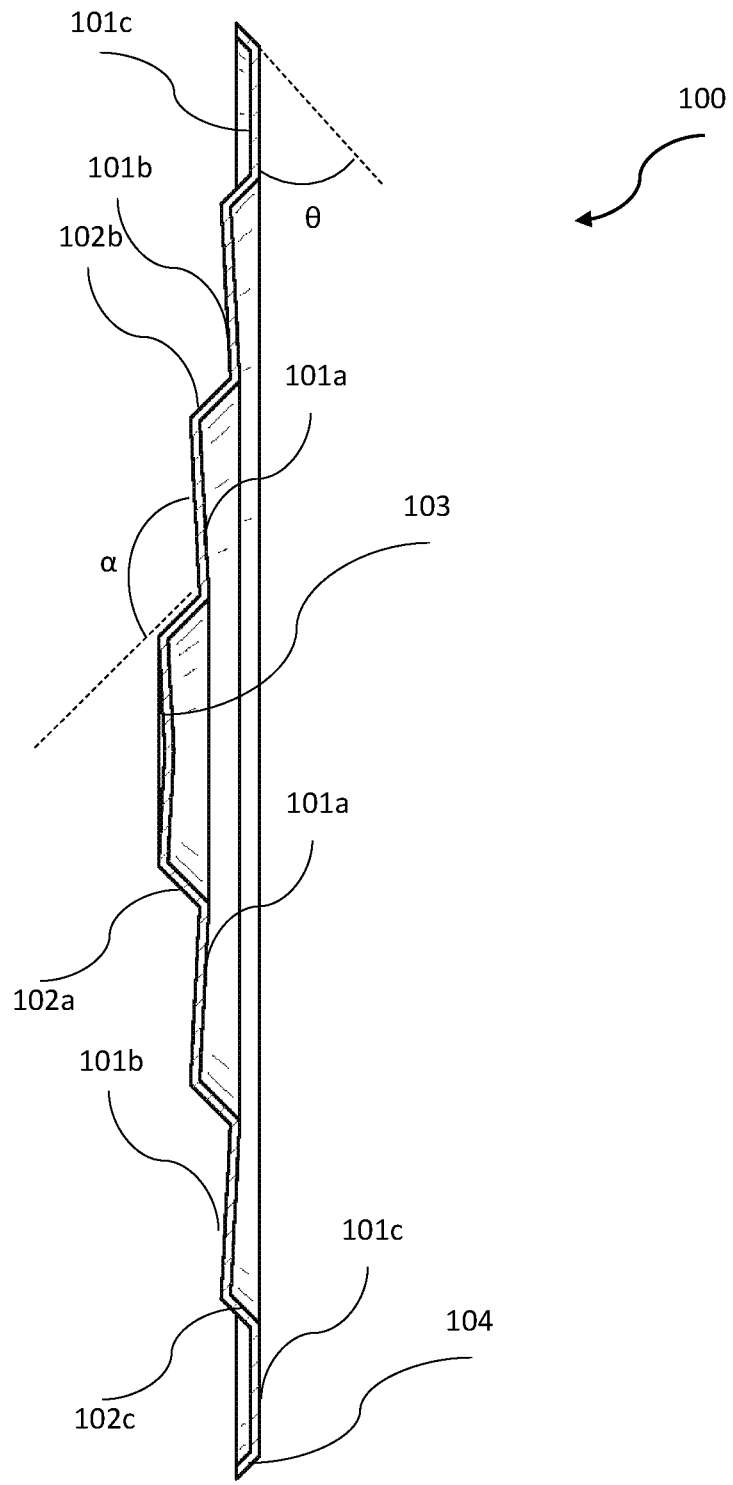
FIG. 5 is a cross-sectional view of the pan of FIG. 3 along line 5-5.

As perhaps best seen in FIGS. 3-4, each of the plurality of nested tiered bands 101a-101c and the plurality of canted strips 102a-102c is illustratively circle-shaped. In other embodiments, each of the plurality of nested tiered bands 101a-101c and the plurality of canted strips 102a-102c may be oval-shaped, round-shaped, or polygon-shaped.

In some embodiments, the pan 100 may comprise a metallic material resilient to normal temperatures in the baking oven. For example, the metallic material may comprise one or more of aluminum, stainless steel, or iron. In other embodiments, polymer materials may be used so long as they are temperature resilient. In some embodiments, the pan 100 may comprise a mesh material, such as a metallic mesh. In some embodiments, the plurality of nested tiered bands 101a-101c, the plurality of canted strips 102a-102c, the medial body 103, and the peripheral flange 104 may be integral and a product of being integrally formed during manufacturing, for example, from an injection mold process or a metal casting process. In other embodiments, the components may be welded together.

In some other embodiments, the pan 100 may be formed from a flat piece of metallic material and pressed into the illustrated form. For example, in one application, there would be a circular blanking tool before being pressed by a forming tool. The raw edge would go into a spinning machine to form a safe rolled finish.

Another aspect is directed to a method for making a pan 100 for receiving and baking a food product 105 in a baking oven. The method also includes forming a plurality of canted strips 102a-102c coupled between a plurality of nested tiered bands 101a-101c, each canted strip being canted with respect to adjacent nested tiered bands. The method further comprises forming a medial body 103 within an innermost nested tiered band 101a of the plurality of nested tiered bands 101a-101c, and forming a peripheral flange 104 extending from an outermost nested tiered band 101c of the plurality of nested tiered bands.

Yet another aspect is directed to a method for baking a food product 105 in a pan 100 in a baking oven. The pan 100 comprises a plurality of nested tiered bands 101a-101c, and a plurality of canted strips 102a-102c coupled between the plurality of nested tiered bands. Each canted strip 102a-102c is canted with respect to adjacent nested tiered bands 101a-101c. The pan 100 also includes a medial body 103 within an innermost nested tiered band 101a of the plurality of nested tiered bands 101a-101c, and a peripheral flange 104 extending from an outermost nested tiered band 101c of the plurality of nested tiered bands. The method includes forming placing the food product 105 on the pan 100, and placing the pan and food product in the baking oven.

Advantageously, the pan 100 may more efficiently cook the food product 105 in the baking oven. In particular, the pan 100 permits a lower baking temperature in commercial applications, which provides energy savings. Further, in residential applications, at the typical baking temperature, the pan 100 may provide for a reduced baking time, again providing energy savings and time savings, which are helpful in commercial applications. In applications where the food product 105 is a pizza product, the tiered structure of the pan 100 may prevent topping sliding during the baking process. Further, in applications where the pizza product is frozen and is being baked from the frozen state, the medial body 103 provides concentrated heating to make sure the center of the frozen pizza is thoroughly cooked for the user.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A pan for receiving and baking a food product in a baking oven, the pan comprising:
   a plurality of nested tiered bands, each of the plurality of nested tiered bands being canted at an angle with respect to a horizontal axis;
   a plurality of canted strips coupled between the plurality of nested tiered bands, each canted strip being canted with respect to adjacent nested tiered bands;
   a medial body within an innermost nested tiered band of the plurality of nested tiered bands; and
   a peripheral flange extending from an outermost nested tiered band of the plurality of nested tiered bands, the outermost nested tiered band of the plurality of nested tiered bands being below the innermost nested tiered band of the plurality of nested tiered bands.

2. The pan of claim 1 wherein each of the plurality of nested tiered bands is vertically offset from one another.

3. The pan of claim 1 wherein each of the plurality of nested tiered bands is tiered to have a different vertical height, the innermost nested tiered band being above the other nest tiered bands.

4. The pan of claim 1 wherein the peripheral flange is canted with respect to the outermost nested tiered band of the plurality of nested tiered bands.

5. The pan of claim 1 wherein the medial body comprises a cone-shaped body.

6. The pan of claim 1 wherein each of the plurality of canted strips is substantially parallel with each other.

7. The pan of claim 1 wherein each of the plurality of nested tiered bands and the plurality of canted strips is circle-shaped.

8. The pan of claim 1 wherein the angle is within a range of 2°-10°.

9. A pizza pan for receiving and baking a pizza product in a baking oven, the pizza pan comprising:
   a plurality of nested tiered bands, each of the plurality of nested tiered bands being vertically offset from one another and being canted at an angle with respect to a horizontal axis;

a plurality of canted strips coupled between the plurality of nested tiered bands, each canted strip being canted with respect to adjacent nested tiered bands;

a medial body within an innermost nested tiered band of the plurality of nested tiered bands; and a peripheral flange extending from an outermost nested tiered band of the plurality of nested tiered bands, the peripheral flange being canted with respect to the outermost nested tiered band of the plurality of nested tiered bands, the outermost nested tiered band of the plurality of nested tiered bands being below the innermost nested tiered band of the plurality of nested tiered bands.

10. The pizza pan of claim 9 wherein each of the plurality of nested tiered bands is tiered to have a different vertical height, the innermost nested tiered band being above the other nest tiered bands.

11. The pizza pan of claim 9 wherein the medial body comprises a cone-shaped body.

12. The pizza pan of claim 9 wherein each of the plurality of canted strips is substantially parallel with each other.

13. The pizza pan of claim 9 wherein each of the plurality of nested tiered bands and the plurality of canted strips is circle-shaped.

14. The pizza pan of claim 9 wherein the angle is within a range of 2°-10°.

15. A method for making a pan for receiving and baking a food product in a baking oven, the method comprising:

forming a plurality of canted strips coupled between a plurality of nested tiered bands, each canted strip being canted with respect to adjacent nested tiered bands, each of the plurality of nested tiered bands being canted at an angle with respect to a horizontal axis;

forming a medial body within an innermost nested tiered band of the plurality of nested tiered bands; and forming a peripheral flange extending from an outermost nested tiered band of the plurality of nested tiered bands, the outermost nested tiered band of the plurality of nested tiered bands being below the innermost nested tiered band of the plurality of nested tiered bands.

16. The method of claim 15 wherein each of the plurality of nested tiered bands is vertically offset from one another.

17. The method of claim 15 wherein each of the plurality of nested tiered bands is tiered to have a different vertical height, the innermost nested tiered band being above the other nest tiered bands.

18. The method of claim 15 wherein the peripheral flange is canted with respect to the outermost nested tiered band of the plurality of nested tiered bands.

19. The method of claim 15 wherein each of the plurality of nested tiered bands and the plurality of canted strips is circle-shaped.

20. The method of claim 15 wherein the angle is within a range of 2°-10°.

* * * * *